United States Patent
Sugiyama et al.

[11] Patent Number: 5,934,714
[45] Date of Patent: Aug. 10, 1999

[54] TUBE FITTING ASSEMBLY

[75] Inventors: Shojiro Sugiyama; Tatsumi Yamamoto; Tsutomu Ohishi, all of Zama, Japan

[73] Assignee: Sugiyama Shoji Co., Ltd., Zama, Japan

[21] Appl. No.: 08/808,841

[22] Filed: Feb. 28, 1997

[30] Foreign Application Priority Data

Feb. 28, 1996 [JP] Japan .................................. 8-067093

[51] Int. Cl.$^6$ ...................................................... F16L 17/02
[52] U.S. Cl. ...................... 285/342; 285/382.7; 285/916; 29/890.15; 72/370.1
[58] Field of Search .................................... 285/341, 342, 285/343, 382.7, 916; 72/370.1, 370.13; 29/890.15

[56] References Cited

U.S. PATENT DOCUMENTS

| | | | |
|---|---|---|---|
| 2,171,217 | 8/1939 | Kreidel | 285/916 X |
| 2,230,116 | 1/1941 | Kreidel | 285/382.7 X |
| 2,484,815 | 10/1949 | Crawford. | |
| 2,738,994 | 3/1956 | Kreidel et al. | 285/382.7 X |
| 3,584,900 | 6/1971 | Lennon | 285/382.7 X |
| 4,076,286 | 2/1978 | Spontelli | 285/382.7 X |
| 4,826,218 | 5/1989 | Zahuranec | 285/382.7 X |

*Primary Examiner*—Dave W. Arola
*Attorney, Agent, or Firm*—Nikaido, Marmelstein, Murray & Oram LLP

[57] ABSTRACT

A tube fitting assembly is provided in which the back sleeve 4 can be simply fabricated without any reduction in its corrosion resistance. The back sleeve 4 is fabricated by pressing the exterior edge of the front end of a short column with a roller 6 of greater hardness than the short column whereby a tapered face 42 is formed on the outer edge of the front end that is harder than the rest of the piece. A bore or cavity is then bored axially through the short column. Thereafter, the back sleeve 4 so formed can be assembled with the tube to be connected, the coupling body 2, the front sleeve 3, and the envelope nut 5 to form an effective tube fitting assembly.

2 Claims, 4 Drawing Sheets

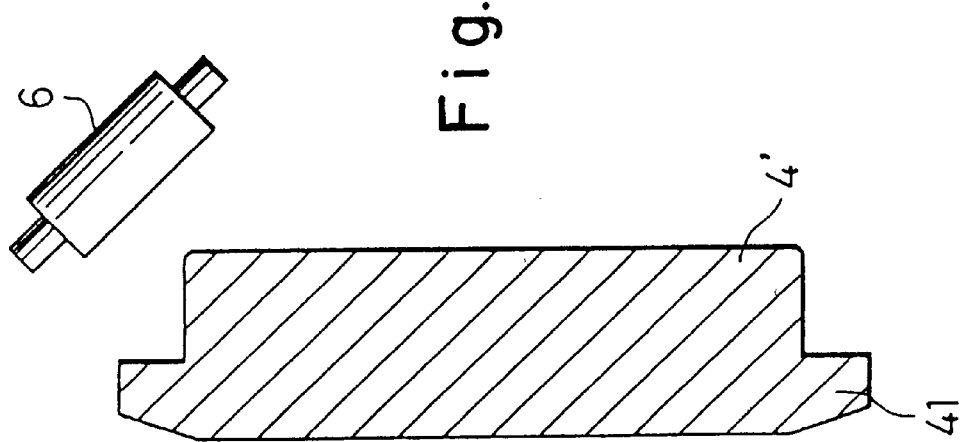
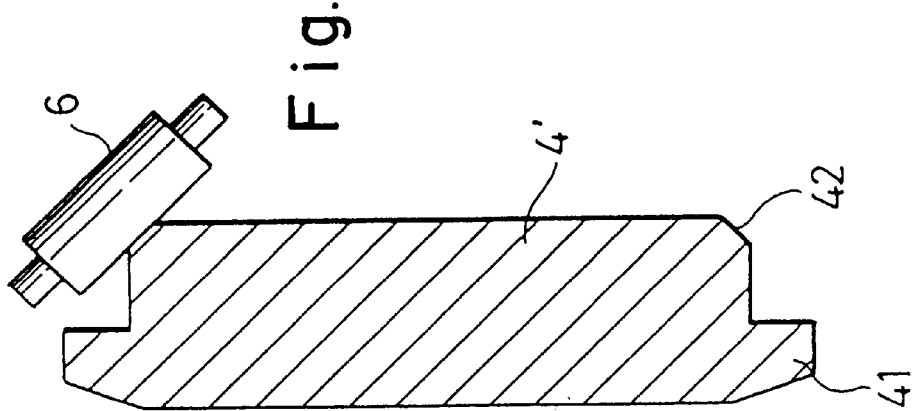
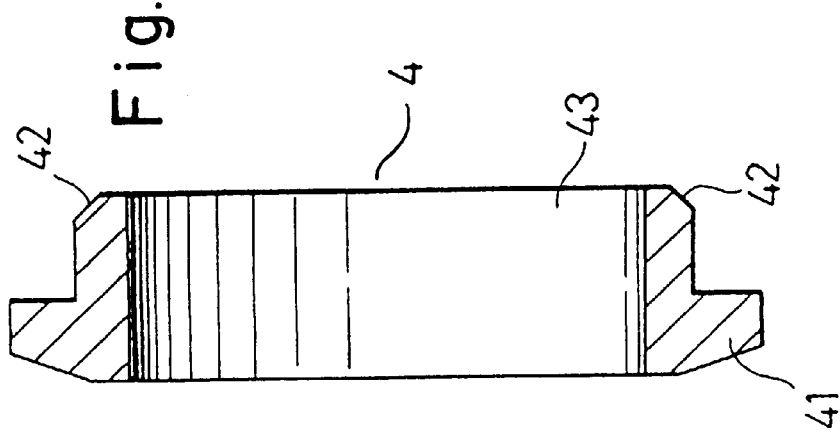

TUBE FITTING ASSEMBLY

BACKGROUND OF THE INVENTION

This invention relates to a tube fitting assembly for use in tubing employed, for example, in an industrial plant and in analytical equipment.

FIGS. 4 and 5 show an example of a tube fitting assembly. Since the devices shown in FIGS. 4 and 5 could represent both conventional devices and the devices in accordance with the present invention, the same reference numerals are used to show and describe the similar parts of both types of devices even though they are the elements of different devices. The assembly includes a tube 1, a coupling body 2, a front sleeve 3, a back sleeve 4, and an envelope nut 5. The back sleeve 4 is not of uniform hardness, with the forward end being hard and the rest of the piece being relatively softer. To assemble these components, first the envelope nut 5, then the back sleeve 4 and the front sleeve 3 are fitted in order around the outer perimeter of the tube 1. Next, the end of the tube 1 is inserted into the mouth of the coupling body 2, and the envelope nut at the rear is threaded onto the coupling body, turned and tightened with appropriate hardware.

However, the coupling body 2 is designed to restrict forward movement of the back sleeve 4 and front sleeve 3. Accordingly, the back sleeve 4 and front sleeve 3 cannot move in the axial direction beyond a prescribed distance, and further, the envelope nut 5 prevents their outward expansion. Therefore, the driving force of the envelope nut 5 is expanded towards the inner walls of the back sleeve 4 and front sleeve 3; in other words the driving force escapes by expanding in the direction of the tube 1. As a result, as shown in FIG. 6 which shows a conventional device, the inner walls of the front sleeve 3 and of the back sleeve 4 bite, albeit very minimally, into the surface of the tube 1.

Once the back sleeve 4 and front sleeve 3 bite into the surface of the tube 1, the tube is completely sealed in the fitting to resist the force of the internal pressure in the tube tending to loosen it, and a stable fitting can be maintained.

The conventional tube fitting assembly as described above has the following potential problem.

In order to provide the aforementioned functions, as described above, the back sleeve 4 is not of uniform hardness, wherein only the forward end is hard and the rest of the piece is relatively softer. Therefore, as shown in FIG. 6, as it is being tightened with the envelope nut 5, the relatively softer rear portion of the back sleeve 4 is the first to plastically deform, and as it is being compressed, applies pressure onto the front sleeve 3 in the axial direction of the fitting. In other words, the tube 1 is sealed and secured by an efficient use of this difference in hardness distribution of the back sleeve 4, namely with only the front tip being hard and the rest of the piece being relatively softer.

To obtain this difference in hardness distribution, conventionally, in fabricating the back sleeve 4, the front end thereof is carburized to increase its surface hardness. However, although this carburization will increase the surface hardness of the material, the process also markedly reduces its corrosion resistance. Accordingly, with progressive operation of the equipment, the surface of the back sleeve 4 of the tube fitting will gradually corrode, and eventually the corrosion product such as rust so formed could contaminate the material flowing through the tubing. This could result in erroneous results if the tubing is connected to equipment being used for inspection or other analytical work.

Moreover, the carburization process requires special equipment and skilled labor, and is ultimately uneconomical.

OBJECT AND SUMMARY OF THE INVENTION

This invention was designed to resolve the problem as described above. To that end, the object of this invention is to provide a tube fitting assembly for use in industrial tubing in which one of the components, namely the back sleeve 4, can be fabricated by a simple process which will not adversely affect its corrosion resistance property.

In order to achieve this object, this invention provides a tube fitting assembly comprising the tube to be connected and a back sleeve, front sleeve, coupling body, and envelope nut; wherein to fabricate the back sleeve, the exterior edge of the front end of a short column is pressed with a roller of greater hardness than the short column, and then a cavity is bored axially through the short column to fabricate a cylindrical sleeve with a tapered face on the outer edge of the front end which is harder than the rest of the piece. The back sleeve so fabricated is then assembled with the front sleeve, the coupling body, and the envelope nut onto the tube to be connected.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 1, 2, and 3 illustrate diagrammatically the process of forming a component, the back sleeve for example, of the tube fitting assembly of the present invention;

DETAILED DESCRIPTION OF A PREFERRED EMBODIMENT

Figure 4:
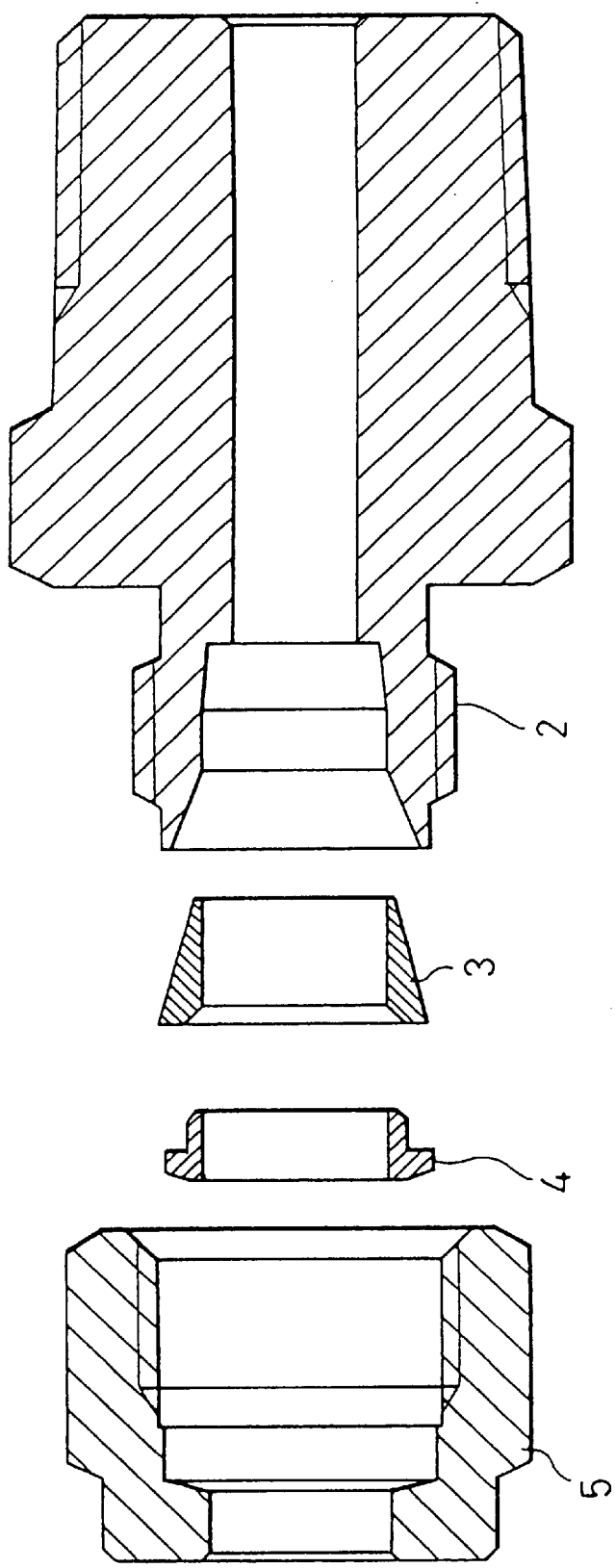
FIG. 4 is an exploded cross-sectional view of the components of a tube fitting assembly, both of the conventional type and of the present invention.
Figure 5:
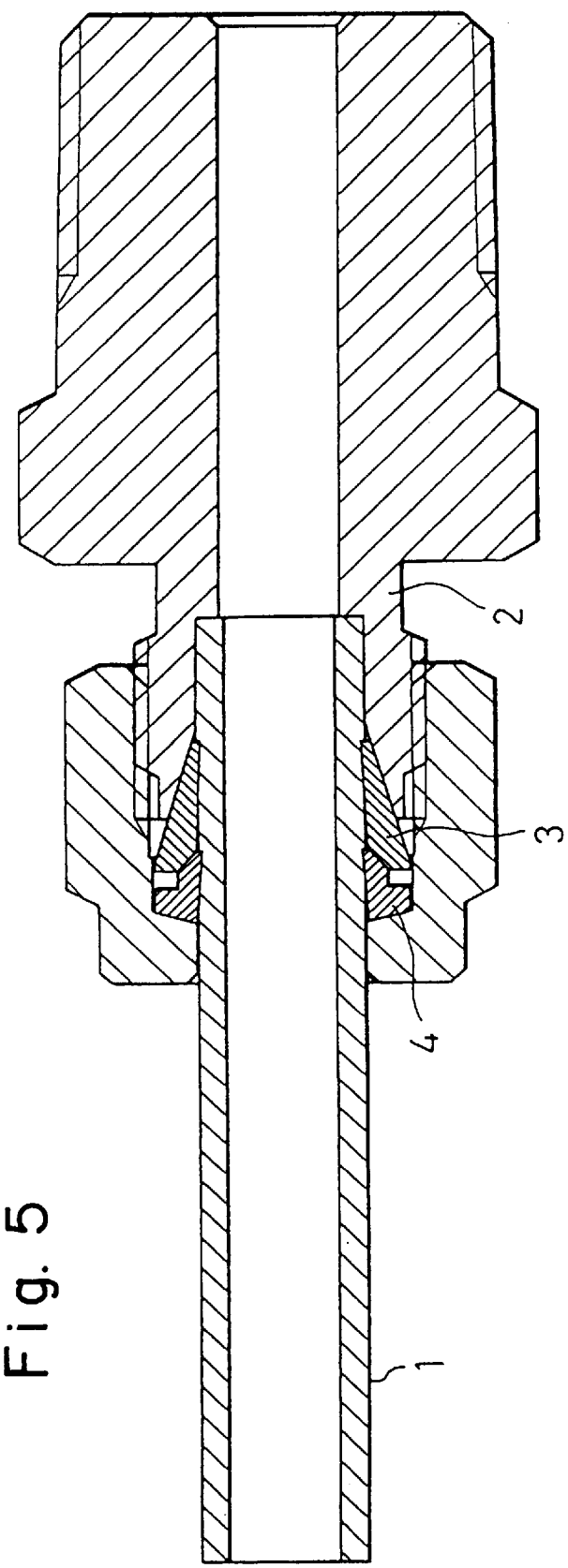
FIG. 5 is a cross-sectional view of the components of FIG. 4 assembled with a tube.
Figure 6:
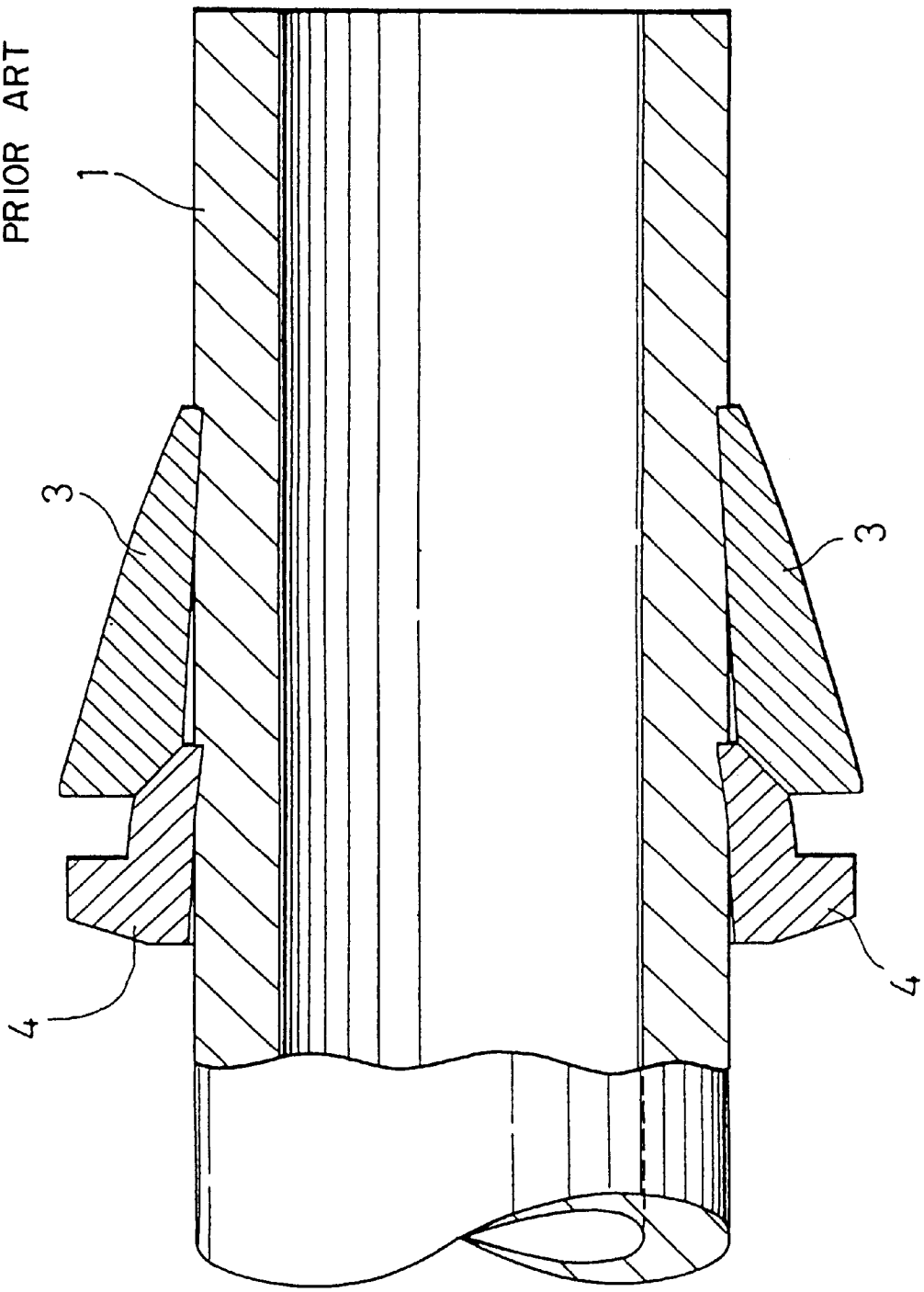
FIG. 6 is a partial cross-sectional view of the effects of assembly of the components of the conventional tube fitting assembly.

An example of the tube fitting assembly of this invention is explained with reference to FIGS. 1–5.

As described previously, the tube fitting assembly of this invention is configured from a tube 1, a coupling body 2, a front sleeve 3, a back sleeve 4, and an envelope nut 5.

FIGS. 1, 2, and 3 show some of the fabrication steps of the back sleeve 4 of the present invention. The back sleeve 4 is fabricated from a short column 4' of metal, wherein a flange, 41 of an external diameter larger than the external diameter of the short column 4' is first formed on the rear end or segment. Then, in that partially fabricated state, a pressurized roller 6 is rotated around the outer edge of the end of the short column 4' opposite the flange. The roller 6 is to be of a hardness greater than that of the short column. As a result of the rolling, a very hard tapered surface 42 of a hardness greater than the rest of the piece is formed on the outer edge of the front end of the short column 4'. Thereafter, a cavity or bore 43 is formed axially through the center of the short column 4' by any suitable technique to complete the fabrication of the back sleeve 4.

The corrosion resistance properties of back sleeves 4 fabricated by the aforementioned method were compared with those of sleeves which were not pressed by a roller 6, and of sleeves which were fabricated by the conventional carburization process. This comparison test is an excerpt from "Test Results" (No. 553), which was published under the name of the director of the Shizuoka Industrial Engineering Center, a public agency in Shizuoka Prefecture, on Feb. 13, 1996.

Date of test: Feb. 1–2, 1996

Equipment: Model ST-ISO-2F (Suga Shikenki K.K.)

Test method: 8 types of back sleeves were tested, and each type was tested at 3 points for a total of 24 points. A 24-hour continuous salt spray test was performed in accordance with the standard JIS-Z-2371.

TABLE 1

Results of Salt Spray Tests (Corrosion Resistance)

|  | After 8 hours | After 24 hours |
|---|---|---|
| Sleeve fabricated by method of invention | No Rust | No rust |
| Sleeve 1 fabricated by carburization | Rusted | Rusted |
| Sleeve 2 fabricated by carburization | Rusted | Rusted |
| Sleeve 3 fabricated by carburization | Rusted | Rusted |
| Sleeve 4 fabricated by carburization | Rusted | Rusted |
| Sleeve 5 fabricated by carburization | Rusted | Rusted |

These tests proved that the back sleeve 4 fabricated by the method of this invention was superior in terms of corrosion resistance than a sleeve fabricated by the conventional carburization treatment.

However, a product of superior corrosion resistance is of no value if its hardness is reduced. Accordingly, the hardness of various sections of the back sleeves 4 fabricated by the method of this invention were compared with those of sleeves fabricated by the conventional carburization method.

Hardness was measured in three spots of the back sleeve 4: (1) near the flange 41, (2) in the center of the sleeve, and (3) near the hard tapered face 42. Results are shown in the following table.

TABLE 2

Hardness Measurements

| (unit: Hv) | (1) | (2) | (3) |
|---|---|---|---|
| Sleeve fabricated by method of Invention | 149 | 219 | 322 |
| Sleeve 1 fabricated by carburization | 174 | 176 | 446 |
| Sleeve 2 fabricated by carburization | 144 | 278 | 253 |
| Sleeve 3 fabricated by carburization | 168 | 178 | 405 |
| Sleeve 4 fabricated by carburization | 152 | 161 | 310 |

These tests proved that the roller processing did not cause a marked reduction in the hardness of the various sections. A sleeve with a hardness distribution virtually equivalent to that a product manufactured by the conventional method can be obtained.

The tube fitting is assembled using the back sleeve 4 as fabricated by the roller-pressing method of the present invention, the tube 1, the coupling tube 2, the front sleeve 3, and the envelope nut 5.

The tube fitting assembly of the present invention as explained above can provide certain clear advantages. By configuring the back sleeve 4 such that its front end is harder than the rest of the piece, the back sleeve 4 can be more easily deformed by the pressure of the envelope nut 5. This enables the back sleeve to bite into the surface of the tube 1, providing a tight fitting with a good seal. The corrosion resistance of the back sleeve 4 of this invention is much superior to that of a sleeve fabricated by the conventional carburization treatment. Accordingly, where tubing has been coupled to equipment used for precision analytical work, the material flowing through the tube will not be contaminated by corrosion product, such as rust, from the back sleeve. Consequently, results obtained will be more reliable. The hardness, functionality, and assembly processes are virtually identical to that of other conventional couplings, requiring no special fabrication processes or particularly skilled labor. The effectiveness of the seal and the tightness of the fitting are identical to conventional couplings; however, the superior corrosion resistance of the tube fitting assembly of this invention enables the effectiveness of the seal and the tightness of the fitting to be maintained for a prolonged period, thus adding to the commercial value of the product. The very hard tapered face is processed by pressing with a harder roller, thus the face has no minute pocks or bubbles to weaken its structural strength. This improves the durability of the device.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A tube fitting assembly comprising a tube to be connected, a back sleeve comprising a short solid column having a front end with a tapered face slidably fittable to the tube, a front sleeve slidably fittable to the tube adjacent the back sleeve, a coupling body having a bore and external threads, and an envelope nut having internal threads; said tube being inserted into said bore in said coupling body with said envelope nut being threadingly engaged with said coupling body pressing said front sleeve and said back sleeve to engage and seal said tube with said coupling body; wherein said back sleeve tapered face engages said front sleeve and said back sleeve is made by pressing an exterior edge of said front end of said short solid column with a roller of greater hardness than said short column, and forming a bore axially through said short column to form a cylindrical sleeve with said tapered face on an outer edge of the front end that is harder than the rest of the sleeve.

2. A method of fabricating a back sleeve for a tube fitting assembly, comprising the steps of:

forming a solid short metal cylindrical column having a rear end, a front end, and a coaxial flange on said rear end, pressing an exterior edge of said front end of said short solid column with a roller of greater hardness than said short column to form a tapered face on said exterior edge which is harder than the rest of said short column, and forming a bore axially through said short column to form a cylindrical sleeve having said tapered face on an outer edge of said front end that is harder than the rest of the sleeve.

* * * * *